United States Patent [19]

Schmidt

[11] Patent Number: 5,320,513

[45] Date of Patent: Jun. 14, 1994

[54] PRINTED CIRCUIT BOARD FOR AN INJECTION MOLDING APPARATUS

[75] Inventor: Harald Schmidt, Georgetown, Canada

[73] Assignee: Husky Injection Molding Systems Ltd., Bolton, Canada

[21] Appl. No.: 988,863

[22] Filed: Dec. 10, 1992

[51] Int. Cl.[5] .................. B29C 45/20; B29C 45/78
[52] U.S. Cl. .................. 425/143; 264/40.6;
264/328.15; 425/549; 425/570; 425/572
[58] Field of Search ............ 425/144, 143, 549, 570, 425/572; 264/328.15, 40.6

[56] References Cited

U.S. PATENT DOCUMENTS

| | | | |
|---|---|---|---|
| 4,150,281 | 4/1979 | Hinz | 425/144 |
| 4,533,787 | 8/1985 | Anderegg et al. | 174/68.5 |
| 5,030,084 | 7/1991 | Gellert et al. | 425/549 |

Primary Examiner—Tim Heitbrink
Attorney, Agent, or Firm—Bachman & LaPointe

[57] ABSTRACT

An injection molding station includes a mold manifold plate housing a plurality of injection molding nozzles and housing heaters for the plurality of injection molding nozzles; at least one printed circuit board associated with the mold manifold plate; and a power source; wherein the at least one printed circuit board electrically connects the power source with the heaters. Each printed circuit board has at least one power layer printed with a plurality of power supply tracks, the power supply tracks being connected at a first end to the power source and at a second end to a respective heater. Each nozzle may also have a respective temperature sensing device, the printed circuit board having at least one sensor layer printed with sensor tracks, the sensor tracks being connected at a first end to a respective temperature sensing device, and at a second end to a controlling device.

26 Claims, 3 Drawing Sheets

PRINTED CIRCUIT BOARD FOR AN INJECTION MOLDING APPARATUS

BACKGROUND OF THE INVENTION

1. Field of the Invention

The invention relates to the field of injection molding and, more particularly, to a printed circuit board wiring system for nozzle heaters of an injection molding system.

2. Description of the Related Art

In the field of plastic injection molding, hot runner or "runnerless" injection molding machines are well known and commonly used. In these machines, each cavity of a mold is served, usually by a heated nozzle or "drop" which delivers melted resin from channels in a heated manifold to the respective mold. Recent developments have provided injection molding machines where each nozzle is independently heated and controlled. This independent temperature control is achieved by providing a heater and a temperature sensing device such as a thermocouple at each nozzle, and wiring each heater and thermocouple to a power source/controller which supplies power to the heaters and reads the information supplied by the thermocouples. In a typical 96 cavity mold, however, 192 heater wires and 192 thermocouple wires are necessary to operate the nozzles. Conventionally, these wires are run through channels in the mold manifold plate. This set up, however, requires about 1500 feet of wire, and would typically require about 16 hours to set up. Further, a defective wire is very difficult to locate, and replacement usually involves splicing of the wire. Splices, however, are notorious trouble spots for further problems, and also take up extra space in the already overcrowded wiring channels, which are kept to a minimum size in order to maintain the structural strength of the mold manifold plate. Replacing a defective heater also involves threading a new pair of wires through the existing mass of wiring.

European Patent Application No. 0 468 485, published Jan. 29, 1992, provides a pre-wired hot runner system. In this system, heater wiring is routed in a wiring frame and connected to individual heaters with nuts at each terminal, and forms a series of closed conduits connected to a main junction box. The above-described problems encountered with replacing a faulty wire are not addressed by the European Application.

Further, due to the necessity of minimizing the size of wiring channels in the mold manifold plate, the length of each wire must be carefully optimized in a pre-wired system, resulting in a non-flexible wiring system useful only for a specific number and configuration of cavities.

It is desirable to provide a wiring system for an injection molding machine which overcomes the aforedescribed problems with wiring.

Accordingly, it is the principal object of the present invention to provide a wiring system for an injection molding machine which avoids the use of an excessive mass of wiring.

It is a further object of the present invention to provide such a system which minimizes the size of wiring channels formed in the mold manifold plate.

It is a still further object of the present invention to provide such a system which is serviceable from the front of the machine while installed.

It is another object of the present invention to provide such a system wherein splices are not necessary to correct faulty wiring.

It is still another object of the present invention to provide such a system wherein connection of heaters to the wiring system is achieved through conveniently connected and disconnected plugs.

Other objects and advantages will appear hereinbelow.

SUMMARY OF THE INVENTION

The foregoing objects are readily achieved by the present invention, wherein printed circuit boards are utilized to avoid the problems associated with conventional wiring.

According to the invention, an injection molding system comprises: a mold manifold plate housing a plurality of injection molding nozzles and housing heaters for the plurality of injection molding nozzles; at least one printed circuit board associated with the mold manifold plate; and a power source; wherein the at least one printed circuit board electrically connects the power source with the heaters.

Each printed circuit board preferably comprises at least one power layer printed with a plurality of power supply tracks, the power supply tracks being connected at a first end to the power source and at a second end to a respective heater.

Each nozzle preferably has a respective heater and further has a respective temperature sensing means, the printed circuit board having at least one power layer printed with a plurality of power supply tracks and at least one sensor layer printed with a plurality of sensor tracks, the power supply tracks being connected at a first end to the power source and at a second end to a respective heater, the sensor tracks being connected at a first end to a respective temperature sensing means, and at a second end to a controlling means.

BRIEF DESCRIPTION OF THE DRAWINGS

A detailed description of the preferred embodiments of the invention follows, with reference to the attached drawings, wherein.

DETAILED DESCRIPTION OF THE PREFERRED EMBODIMENTS

The invention relates to the field of plastic injection molding, especially to hot runner or "runnerless" injection molding machines and, more particularly, to a wiring system for an injection molding machine having individually heated and controlled nozzles. According to the invention, printed circuit boards are used to provide electrical connection in the injection molding machine in a more reliable, space efficient, and readily serviceable manner.

Figure 1:
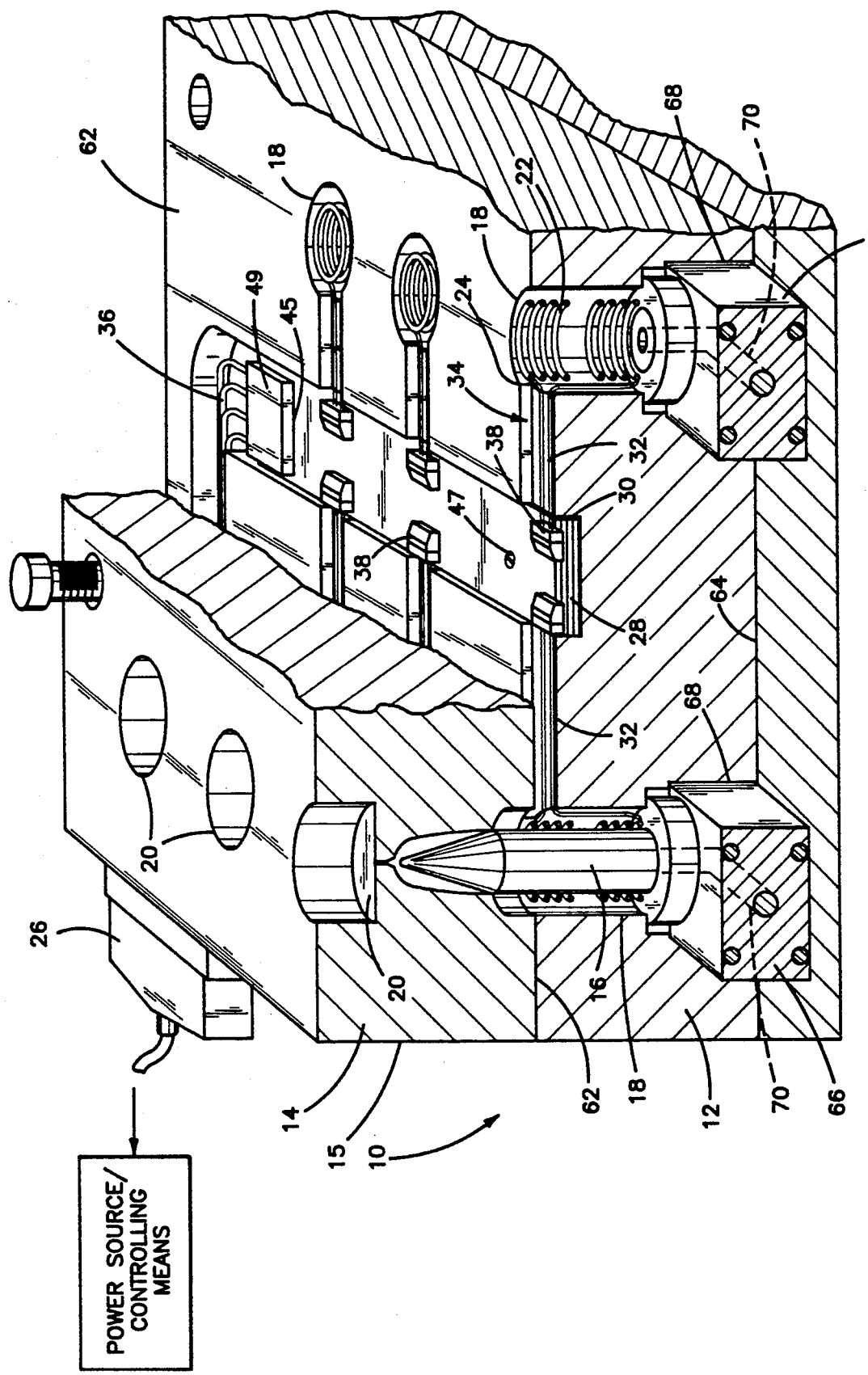
FIG. 1 is a perspective view, partially in section, of an injection molding system according to the invention.

FIG. 1 shows an injection molding system 10 having a mold manifold plate 12, a mold cavity plate 14, and a plurality of nozzles 16 disposed in wells 18 spaced about mold manifold plate 12. As is well known, melted resin or plastic is injected through nozzles 16 and into cavities 20 of mold cavity plate 14 in order to injection mold the articles being manufactured. Each nozzle 16 is heated by heating means such as, for example, a heater 22 disposed in each well 18. Any conventional heater may be used, such as a coil heater as shown schematically in the drawing. The temperature of each nozzle 16 is preferably monitored by a temperature sensing means such as thermocouple 24, which may also be mounted in well 18. In this manner, the temperature of each nozzle 16 and, therefore, the temperature of melted resin supplied through nozzle 16, is individually monitored.

Conventionally, wiring of heaters 22 and thermocouples 24 involves running an unwieldy mass of wires through wiring channels in the mold manifold plate, resulting in numerous problems and complications as discussed above.

According to the invention, heaters 22 and thermocouples 24 are connected to a mold connector 26 through printed circuit boards 28. Printed circuit boards 28 are mounted in association with system 10, preferably in association with mold manifold plate 12, so as to electrically connect heaters 22 and thermocouple 24 with a power source through mold connector 26. Printed circuit boards 28 are preferably mounted in at least one circuit board channel 30, formed on mold manifold plate 12. Printed circuit boards 28 are provided, according to the invention, so as to markedly decrease the space formerly required with conventional wiring systems. Thus, mold manifold plate 12 can be provided having circuit board channel 30 of a smaller dimension than the conventional channels used for wiring, thus providing a mold manifold plate 12 having a greater structural strength.

One or more circuit board channels 30 may be provided on mold manifold plate 12, preferably between rows of wells 18, so that heaters 22 and thermocouples 24 in wells 18 can be conveniently connected to printed circuit boards 28. Each heater 22 and thermocouple 24 preferably has a connector, such as connector wiring 32, for connection to printed circuit boards 28. Connector wiring 32 may preferably be disposed in additional channels 34, also formed on mold manifold plate 12, and preferably intersecting circuit board channel 30.

It should be noted, of course, that any convenient and suitable channel could be used to accommodate printed circuit boards 28. As previously set forth, the object is to eliminate the conventional mass of individual wires running from wells 18 to mold connector 26, and not the specific routing of the channels 30 and/or boards 28. For example, alternate to the embodiment of FIG. 1, printed circuit boards 28 could be mounted, in channels or otherwise, to mold cavity plate 14, for example on a side face 15 thereof, so that printed circuit boards 28 could be accessed for maintenance without removing mold cavity plate 14.

Printed circuit boards 28 may preferably be connected to mold connector 26 through a wiring harness 36 which is also preferably disposed in circuit board channel 30. Mold connector 26 is in turn connected to a conventional power source for the heaters and a conventional controlling means for receiving input from the temperature sensing means, i.e., thermocouples 24 and for controlling power supplied to heaters 22. In this manner, the temperature of nozzles 16 is monitored and controlled. The power source/controlling means is shown schematically in the drawings. Connector wiring 32 is preferably connected to printed circuit board 28 through plug means, preferably two-piece connectors 38.

Figure 2:
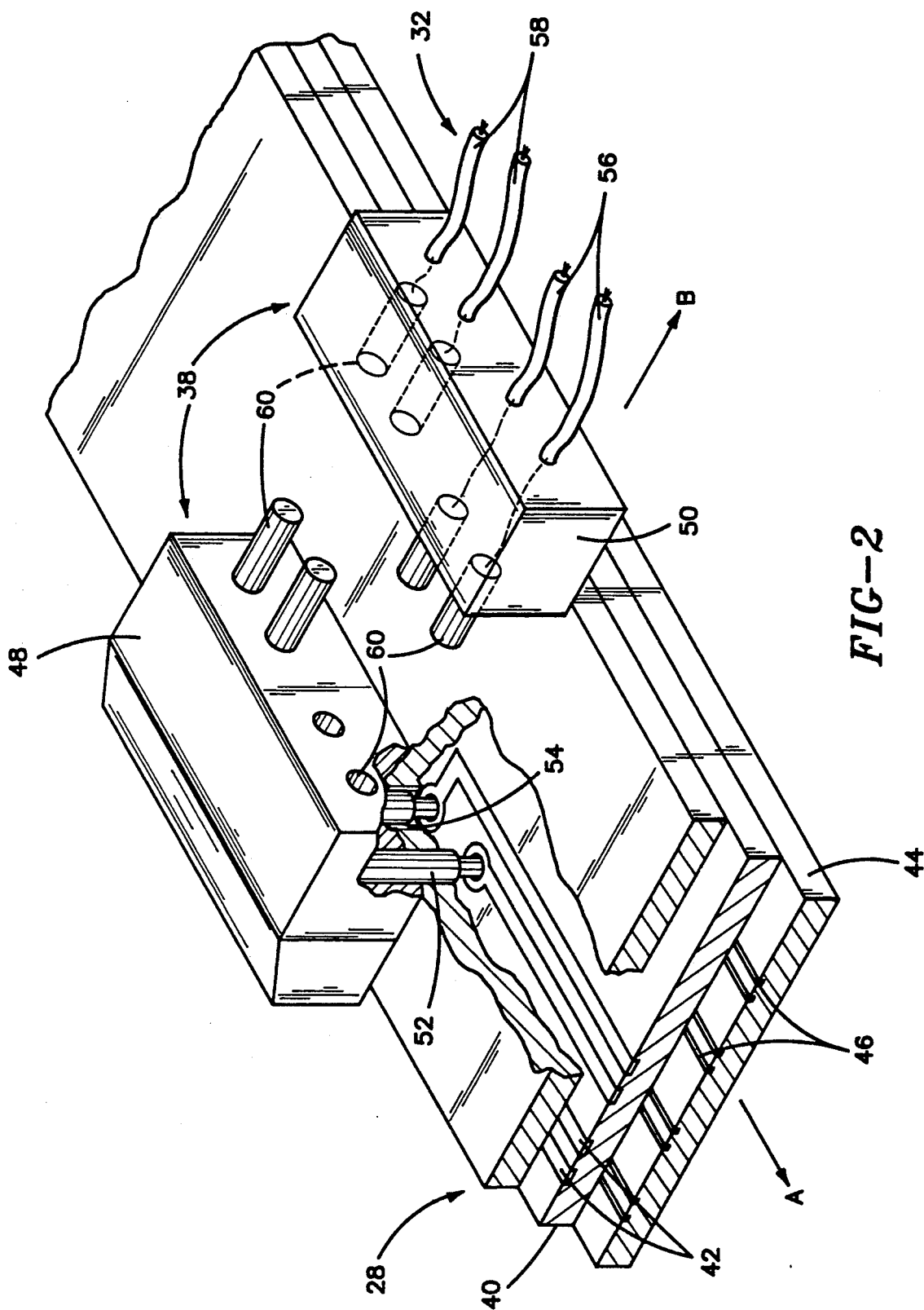
FIG. 2 is a perspective view, partially in section, of a printed circuit board for an injection molding system according to the invention.

Referring to FIG. 2, each printed circuit board 28 preferably comprises a plurality of layers printed with the appropriate conductive tracks. Both sides of each layer are preferably printed with a number of substantially parallel tracks so as to provide the necessary connections in a greatly reduced area as compared to conventional wiring systems. As shown in FIG. 2, each printed circuit board 28 preferably has at least one power layer 40 printed with power supply tracks 42 for supplying power to heaters 22 from the power source (shown schematically in FIG. 1), each power supply track 42 being connected at one end to the power source and at the other end to a respective heater 22. Each printed circuit board 28 is further preferably provided with at least one sensor layer 44 printed with sensor tracks 46 for conveying temperature data to a controlling means (shown schematically in FIG. 1). The tracks are printed on the respective layers in a conventional and well known manner.

According to the invention, printed circuit boards are pre-manufactured at varying predetermined lengths, so that combinations of the boards can be used to conform to numerous cavity layouts of different injection molding machines.

Further in this regard, printed circuit boards 28 are preferably adapted for connection to each other as well as to harness 36. In this manner, several boards 28 may be combined in an endwise manner to accommodate a desired length and number of mold cavities 20. Naturally, successive boards would have additional tracks to connect with incoming tracks from an adjoining board.

Boards 28 are preferably made from a material capable of withstanding expected temperatures of up to about 250° C. Such a material may suitably be a polyimide material such as, for example, Norplex Oak PY260.

Figure 3:
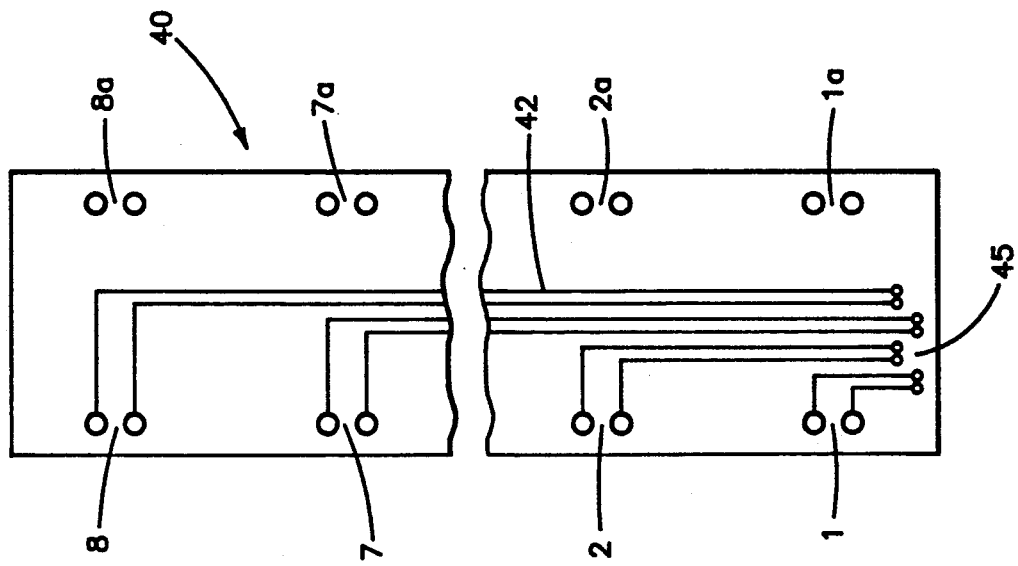
FIG. 3 is a schematic view of a layer of a printed circuit board according to the invention.

A printed circuit board according to the invention may, for example, be provided with layers having 16 tracks (8 pairs) on each side on a typical board which may be 10 mm wide by 2 mm thick. Each track would suitably be about 0.25 mm wide with a 0.25 mm spacing between tracks. One side of a layer of such a board could supply 8 nozzles with 268 watts each at 220 volts AC. FIG. 3 shows a schematic view of one layer of such a board, having 8 pairs of tracks numbered 1–8 on the left side and having 8 pairs numbered 1a–8a on the right side. For simplicity, only the tracks of the left side are shown and the layer is broken away at the middle section, only showing pairs 1, 2, 7 and 8 on the left, and 1a, 2a, 7a, and 8a on the right. As shown, the tracks of board 28 lead to an end 45 of board 28. End 45 could suitably be provided with a junction collector 49, (FIG. 1) for connection to harness 36.

It is noted that both front and back sides of each layer could also be printed with tracks so as to further optimize the number of tracks which can be disposed in a particular space. With such a configuration, it may be desirable to dispose an insulator between adjacent layers so as to insulate the bottom tracks of one layer from the top tracks of the layer below.

A sensor layer 44 for sensor tracks 46 would suitably have a similar layout to the power layer 40 of FIG. 3.

In this configuration, circuit board channel 30 could be formed with a depth of 5 mm. Conventional wiring for a similar number of heaters would require a channel 20 mm deep. Further, a faulty track or other failure of a board 28 is remedied by unplugging the board and replacing it, a procedure which takes considerably less time than locating and replacing a faulty wire.

Boards 28 may be spaced from mold manifold plate 12 by conventional mounting screws 47. Alternatively, boards 28 could be mounted directly to mold manifold plate 12 so as to improve the strength of mold manifold plate 12.

Once all connections to boards 28 are completed, a conformal coating may be applied over the board to protect same from attack by any gases generated during the injection molding process. Such a coating could be applied by the user through any conventional means.

Each two piece connector 38 preferably includes a fixed plug 48 attached to printed circuit board 28 and a movable plug 50 disposed at the end of connector wiring 32. Each fixed plug 48 is preferably mounted to printed circuit board 28 through conductive pins 52. Each fixed plug 48 preferably has two pairs of conductive pins 52. One pair is inserted into printed circuit board 28 so as to connect with a pair of power tracks 42 on a power layer 40, while a second pair of pins 52 connects with a pair of sensor tracks 46 on a sensor layer 44. Other fixed plugs 48, not shown, are positioned so as to connect with other pairs of power tracks 42 and sensor tracks 46. Pins 52 may preferably connect with tracks on a desired layer through holes 54 arranged in the layers of printed circuit board 28. Pins 52 in such a configuration could be insulated along their length so as to provide contact with only the desired tracks of the desired layer. In this manner, fixed plugs 48 can be connected to the appropriate tracks on the appropriate layer by providing pins 52 having a suitable length.

Naturally, power tracks and sensor tracks could suitably be printed on the same layer of a printed circuit board. Separate layers are preferable, however, because of the complications involved in printing a layer with the different materials from which the two types of tracks are to be made.

Movable plugs 50 are preferably connected to connector wiring 32 which includes a pair of heater wires 56 and a pair of sensor wires 58. Each two-piece connector 38 provides a connection between a pair of heater wires 56 and a pair of power tracks 42 so as to supply power to heaters 22, and also provides a connection between a pair of sensor wires 58 and a pair of sensor tracks 46 so as to transmit temperature data to the controlling means. This connection may preferably be provided with a number of male/female conductive pin connections 60 as shown in FIG. 2. This configuration allows convenient and releasable connection of movable plug 50 to the closest available fixed plug 48, thus minimizing the length of connector wiring 32 and furthering the overall objective of the invention of avoiding complex and space consuming masses of wiring. Further, pin connections 60 allow convenient disconnect of printed circuit boards 28, thus facilitating removal of a board for maintenance, repair or replacement.

It should be noted that pins 52 are electrically connected to tracks of the printed circuit board through any conventional process such as, for example, welding. Such weld connections, however, would be subject to attack from gases likely to be generated during plastic injection molding. Accordingly, the pin connections of the present invention are preferably provided with means to protect them from such gas attack. According to a preferred embodiment of the invention, the pin connections are gold plated, the gold plate being resistant to attack by gasses which may be generated. Alternatively, each pin connection could be adapted so as to be substantially gas tight.

Referring to FIG. 1, mold manifold plate 12 preferably has a front face 62, facing the mold cavity plate 14, and a rear face 64. According to the invention, circuit board channels 30 and additional channels 34 are formed in front face 62. In this configuration, when mold cavity plate 14 is moved away from mold manifold plate 12, printed circuit boards 28 and connector wiring 32, as well as nozzles 16, and heaters 22, are fully accessible for maintenance without disassembling the injection molding system 10.

Still referring to FIG. 1, nozzles 16 are preferably disposed in wells 18 on a manifold 66 which is mounted in a manifold channel 68 preferably formed on rear face 64 of mold manifold plate 12, as shown. Manifold 66 conveys melted resin or plastic from its source (not shown) through branched conduits 70 to each nozzle 16.

In this manner, mold manifold plate 12 with heaters 22, thermocouples 24 and connector wiring 32 attached, is conveniently provided to a user who can assemble the system for use by merely connecting two-piece connectors 38, thus avoiding complicated and time consuming assembly.

The temperature sensing device at each nozzle 16 is preferably a thermocouple 24 as thermocouples are the accepted means in the industry for monitoring the temperature of nozzle 16. When thermocouples are used, care should be taken to ensure that sensor tracks 46 are made of a material which will not interfere with the operation of the thermocouple. As is known, a thermocouple is operative to monitor the temperature difference between the ends of a pair of wires. The wires are made from a different material from each other, and are joined at a junction located at the point where temperature is to be measured. The temperature difference between the junction and the other ends of the wires of the pair, (usually kept at a controlled temperature), generates a voltage in each wire which voltage is different based upon the material of the wire in which the voltage is generated. Thus, the temperature at the junction can be obtained based upon the measured voltage difference at the ends of the wires of the pair. The thermocouple may suitably be a conventional J-type thermocouple, wherein one wire is iron and the other wire is constantan. The sensor tracks are preferably provided of similar materials so as not to introduce multiple junctions between different materials that would interfere with proper operation of the thermocouple.

As an alternative to thermocouples, resistance temperature detectors (RTD's) could be utilized as the temperature sensing means. Such RTD's could be used to avoid the problem of multiple junction thermocouples, thereby simplifying the preparation of sensor layers 44.

Figure 4:
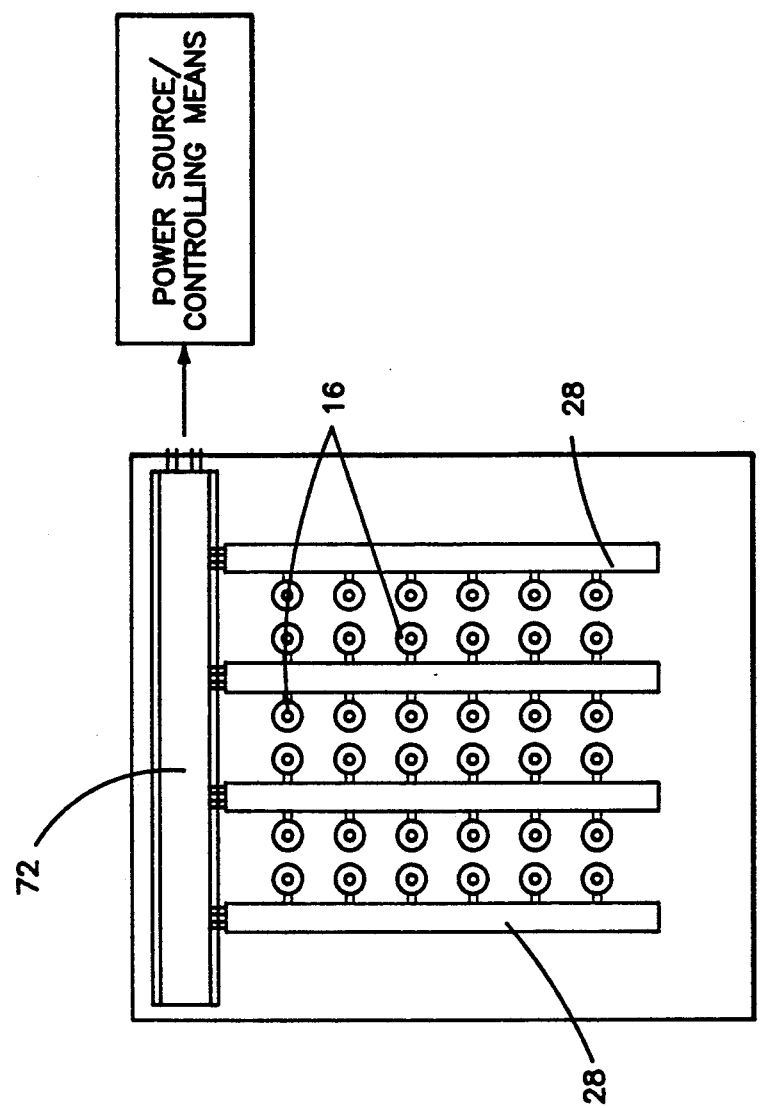
FIG. 4 is a schematic view of an alternate embodiment of the invention.

According to another alternate embodiment of the invention, shown in FIG. 4, mold manifold plate 12 could be provided with a mother board 72, mounted for example along the top of mold manifold plate 12, with a number of printed circuit boards 28 mounted between rows of nozzles 16 and connected to mother board 72. Mother board 72, in this configuration, would be connected to the electrical power source and controlling means. This embodiment of the invention provides additional adaptability of the printed circuit boards 28 to different injection molding patterns.

It should be noted that while FIG. 1 schematically illustrates the controlling means as an external member, the controlling means could, of course, be mounted to the system. Furthermore, according to an alternate embodiment of the invention, the controlling means could be an integral element of printed circuit boards 28. For example, printed circuit boards 28 could be provided with chips and other hardware and/or software or the like so as to receive temperature signals from thermocouples 24 and generate appropriate signals for controlling power supplied to heaters 22.

It should also be noted that manifold 66, which is heated as set forth above, could also advantageously have heaters (not shown) connected through the printed circuit board system of the present invention so as to provide electrical connection for control of such manifold heaters while eliminating still more conventional wiring.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molding apparatus, comprising:
   a mold manifold plate housing a plurality of injection molding nozzles and housing heaters for the plurality of injection molding nozzles;
   at least one printed circuit board, associated with the mold manifold plate;
   a power source; wherein the at least one printed circuit board electrically connects the power source with the heaters; and
   wherein the at least one printed circuit board comprises at least one power layer printed with a plurality of power supply tracks, each power supply track being connected at a first end to the power source and at a second end to a respective housing heater.

2. An injection molding apparatus according to claim 1, wherein the at least one printed circuit board is mounted to the mold manifold plate.

3. An injection molding apparatus according to claim 1 wherein the at least one printed circuit board comprises layers made from a polyimide material.

4. An injection molding apparatus according to claim 1, wherein the printed circuit board is coated with a conformal coating operative to protect the at least one printed circuit board from gases generated during an injection molding process.

5. An injection molding apparatus comprising:
   a mold manifold plate housing a plurality of injection molding nozzles and housing heaters for the plurality of injection molding nozzles;
   at least one printed circuit board, associated with the mold manifold plate;
   a power source; wherein the at least one printed circuit board electrically connects the power source with the housing heaters;
   wherein the mold manifold plate has a front face, the at least one printed circuit board being mounted to the front face of the mold manifold plate whereby the at least one printed circuit board is servicable without disassembling the injection molding apparatus; and
   wherein the mold manifold plate has at least one circuit board channel formed in the front face, the at least one printed circuit board being mounted in the at least one circuit board channel.

6. An injection molding apparatus according to claim 5 wherein the mold manifold plate has additional channels formed therein between the heaters and the at least one circuit board channel, a connector for each heater being disposed in an additional channel and connected to the at least one printed circuit board.

7. An injection molding apparatus, comprising:
   a mold manifold plate housing a plurality of injection molding nozzles and housing heaters for the plurality of injection molding nozzles;
   at least one printed circuit board, associated with the mold manifold plate;
   a power source; wherein the at least one printed circuit board electrically connects the power source with the housing heaters;
   wherein each nozzle of the plurality of injection molding nozzles has a respective housing heater and further has a respective temperature sensing means whereby the temperature of each nozzle is monitored; and
   wherein the at least one printed circuit board comprises at least one power layer printed with a plurality of power supply tracks and at least one sensor layer printed with a plurality of sensor tracks, each power supply track being connected at a first end to the power source and at a second end to a respective housing heater, each sensor track being connected at a first end to a respective one of said temperature sensing means, and at a second end to a controlling means for receiving input from sensor tracks and controlling power supplied to said power supply tracks.

8. An injection molding apparatus according to claim 7, wherein the temperature sensing means is a plurality of resistance temperature detectors.

9. An injection molding apparatus according to claim 7, wherein the controlling means is an integral element of the at least one printed circuit board.

10. An injection molding apparatus according to claim 7, wherein the temperature sensing means is a plurality of thermocouples each having a junction disposed at a respective injection molding nozzle and wherein the sensor tracks are thermocouple wires.

11. An injection molding apparatus according to claim 10 wherein a heater and a thermocouple for each injection molding nozzle are disposed in the mold manifold plate and electrically connected to plug means for connection to the printed circuit board.

12. An injection molding apparatus according to claim 11, wherein the plug means comprises a plurality of two piece connectors, each two piece connector having a fixed plug and a movable plug, the fixed plug being mounted to the printed circuit board through a first pair of conductive pins contacting a respective pair of power supply tracks and a second pair of conductive pins contacting a respective pair of sensor tracks, the movable plug being connected to the heater and thermocouple of a respective nozzle.

13. An injection molding apparatus according to claim 12 wherein the fixed plug and movable plug of each two piece connector are releasably joined at a conductive pin connection.

14. An injection molding apparatus according to claim 13 wherein at least one of each first pair of conductive pins, second pair of conductive pins and conductive pin connection includes means for protecting from attack of gasses generated during injection molding.

15. An injection molding apparatus according to claim 14, wherein the protecting means includes a gold plating applied to each first pair of conductive pins, second pair of conductive pins and conductive pin connection.

16. An injection molding apparatus according to claim 11 wherein the mold manifold plate has a plurality of wells for accommodating each injection molding nozzle, the respective heater and temperature sensing means for each nozzle being disposed in a respective well of the plurality of wells.

17. An injection molding apparatus according to claim 16 wherein the mold manifold plate has a rear face and at least one manifold channel formed in the rear face and intersecting the plurality of wells, the system further including at least one manifold disposed in the at least one manifold channel, the injection molding nozzles being connected to the manifold in alignment with the wells of the mold manifold plate, the manifold further having a melt channel for conveying material to be injection molded from a source of the material to the injection molding nozzles.

18. An injection molding apparatus comprising:
a plurality of injection molding nozzles for injection molding molten plastic material;
a plurality of heaters associated with the plurality of injection molding nozzles for heating the plurality of injection molding nozzles and the molten plastic material therein;
a power source for the plurality of heaters;
at least one printed circuit board associated with the power source and the plurality of heaters and electrically connecting the power source with the plurality of heaters; and
wherein the at least one printed circuit board includes at least one power layer printed thereon with at least one power supply track, the at least one power supply track being connected at a first location to the power source and at a second location to a respective heater.

19. An injection molding apparatus according to claim 18 further including at least one of a mold manifold plate and a mold cavity plate, wherein the printed circuit board is associated with at least one of the mold manifold plate and the mold cavity plate.

20. An injection molding apparatus according to claim 19 wherein the printed circuit board is mounted to at least one of the mold manifold plate and the mold cavity plate.

21. An injection molding apparatus according to claim 20 wherein the mold manifold plate has a front face, the at least one printed circuit board being mounted to the front face of the mold manifold plate whereby the at least one printed circuit board is serviceable without disassembling the injection molding apparatus.

22. An injection molding apparatus according to claim 19 wherein said printed circuit board is mounted in at least one circuit board channel formed on at least one of said mold manifold plate and mold cavity plate.

23. An injection molding apparatus comprising:
a plurality of injection molding nozzles for injection molding molten plastic material;
a plurality of heaters associated with the plurality of injection molding nozzles for heating the plurality of injection molding nozzles and the molten plastic material therein;
a power source for the plurality of heaters;
a temperature sensing means for each nozzle whereby the temperature of each nozzle is monitored; and
at least one printed circuit board associated with the temperature sensing means, said printed circuit board including at least one sensor layer printed with a plurality of sensor tracks, each sensor track being connected at a first location to a respective one of said temperature sensing means and at a second location to a controlling means for receiving input from the sensor tracks.

24. An injection molding apparatus according to claim 23 wherein the temperature sensing means is a plurality of thermocouples each having a junction disposed at a respective injection molding nozzle.

25. An injection molding apparatus according to claim 23 further including at least one of a mold manifold plate and a mold cavity plate, wherein the printed circuit board is associated with at least one of the mold manifold plate and the mold cavity plate.

26. An injection molding apparatus according to claim 25 wherein the printed circuit board is mounted to at least one of the mold manifold plate and the mold cavity plate.

* * * * *